United States Patent
Park et al.

(10) Patent No.: US 11,581,557 B2
(45) Date of Patent: Feb. 14, 2023

(54) DETERIORATION ESTIMATION SYSTEM FOR FUEL CELL, HYDROGEN SUPPLY SYSTEM FOR FUEL CELL INCLUDING SAME, AND HYDROGEN SUPPLY METHOD FOR FUEL CELL

(71) Applicants: HYUNDAI MOTOR COMPANY, Seoul (KR); KIA MOTORS CORPORATION, Seoul (KR)

(72) Inventors: Jun Young Park, Suwon-si (KR); Soon Woo Kwon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 211 days.

(21) Appl. No.: 16/876,797

(22) Filed: May 18, 2020

(65) Prior Publication Data

US 2021/0135259 A1    May 6, 2021

(30) Foreign Application Priority Data

Nov. 1, 2019  (KR) .......................... 10-2019-0138942

(51) Int. Cl.
| | |
|---|---|
| *H01M 8/04664* | (2016.01) |
| *H01M 8/04082* | (2016.01) |
| *H01M 8/04223* | (2016.01) |
| *H01M 8/04746* | (2016.01) |
| *H01M 8/0444* | (2016.01) |

(Continued)

(52) U.S. Cl.
CPC ... *H01M 8/04671* (2013.01); *H01M 8/04089* (2013.01); *H01M 8/04201* (2013.01); *H01M 8/04231* (2013.01); *H01M 8/04388* (2013.01); *H01M 8/04447* (2013.01);

(Continued)

(58) Field of Classification Search
CPC ......... H01M 8/04388; H01M 8/04447; H01M 8/04089
See application file for complete search history.

(56) References Cited

U.S. PATENT DOCUMENTS

2018/0294497 A1* 10/2018 Asai ..................... H01M 8/04
2019/0190042 A1*  6/2019 Kim ..................... B60L 58/31

FOREIGN PATENT DOCUMENTS

JP   2010-287578    * 12/2010
KR   10-1918292 B1   11/2018

* cited by examiner

*Primary Examiner* — Jonathan Crepeau
(74) *Attorney, Agent, or Firm* — McDonnell Boehnen Hulbert & Berghoff LLP

(57) ABSTRACT

Disclosed are a deterioration estimation system for the fuel cell, a hydrogen supply system for a fuel cell including the same, and a hydrogen supply method for a fuel cell, the deterioration estimation system including a fuel cell which receives hydrogen gas and oxidizing gas respectively supplied to an anode side and a cathode side thereof to generate electrical power, a hydrogen supply line which is connected to the anode side of the fuel cell and supplies gas containing hydrogen gas to the fuel cell, a hydrogen supply valve which is located between the hydrogen supply line and a hydrogen tank, supplies, when opened, hydrogen gas stored in the hydrogen tank to the hydrogen supply line, and blocks the supply of the hydrogen gas when closed, and a deterioration estimating unit which estimates the deterioration state of the fuel cell, based on the opening and closing control of the hydrogen supply valve or a change in the pressure in the hydrogen supply line.

6 Claims, 4 Drawing Sheets

(51) Int. Cl.
*H01M 8/0438* (2016.01)
*H01M 8/04089* (2016.01)
*H01M 8/04955* (2016.01)
*H01M 8/04992* (2016.01)

(52) U.S. Cl.
CPC ... *H01M 8/04753* (2013.01); *H01M 8/04955* (2013.01); *H01M 8/04197* (2016.02); *H01M 8/04992* (2013.01)

DETERIORATION ESTIMATION SYSTEM FOR FUEL CELL, HYDROGEN SUPPLY SYSTEM FOR FUEL CELL INCLUDING SAME, AND HYDROGEN SUPPLY METHOD FOR FUEL CELL

CROSS-REFERENCE TO RELATED APPLICATION

This application claims the priority benefit of Korean Patent Application No. 10-2019-0138942, filed on Nov. 1, 2019 in the Korean Intellectual Property Office, the disclosure of which is incorporated herein by reference.

BACKGROUND

1. Field

The present disclosure relates to a deterioration estimation system for a fuel cell and a hydrogen supply system and method for a fuel cell, which controls the supply of hydrogen to a fuel cell, based on the degree of the estimated deterioration of the fuel cell.

2. Description of the Prior Art

A fuel cell converts chemical energy into electrical energy through a redox reaction between hydrogen and oxygen supplied from a hydrogen supply device and an air supply device, respectively, and includes a fuel cell stack for producing electrical energy and a cooling system for cooling the fuel cell stack.

That is, hydrogen is supplied to an anode side of a fuel cell, and at the anode, hydrogen undergoes an oxidation reaction to generate protons and electrons. At this time, the generated protons and electrons flow from the anode to the cathode through an electrolyte membrane and a separator, respectively. Water is generated at the cathode through an electrochemical reaction involving the protons and electrons drawn from the anode as well as oxygen in the air. This flow of electrons produces electrical energy.

Since hydrogen supplied to an anode side of a fuel cell should be maintained at an appropriate hydrogen concentration level, hydrogen purging of a hydrogen supply line is appropriately controlled, and a hydrogen supply valve, which is located between a hydrogen tank and the hydrogen supply line to adjust hydrogen supply, is opened or closed to allow the pressure in the hydrogen supply line to follow a target pressure.

Meanwhile, the hydrogen concentration supplied to an anode side of a fuel cell should be appropriately maintained in consideration of deterioration of a fuel cell stack and fuel efficiency thereof. However, as an electrolyte membrane included inside the fuel cell stack deteriorates, a crossover amount increases between the anode and the cathode through the electrolyte membrane. Accordingly, accurate estimation of a crossover amount inside the fuel cell stack becomes difficult. As a result, there is a problem that it is difficult to control a hydrogen concentration supplied to the anode side of a fuel cell.

It should be understood that the description of the background art above is merely for the purpose of promoting an understanding of the background of the present disclosure and is not to be construed as an admission that the above-described background art constitutes the prior art known to those skilled in the art.

SUMMARY

The present disclosure has been proposed to solve this problem, and aims to provide a fuel cell system for enabling the estimation of deterioration of a fuel cell stack and taking the estimated deterioration into account in order to appropriately control a hydrogen concentration supplied to an anode side of a fuel cell.

In order to achieve the above object, a deterioration estimation system for the fuel cell according to the present disclosure includes: a fuel cell which receives hydrogen gas and oxidizing gas respectively supplied to an anode side and a cathode side thereof to generate electrical power; a hydrogen supply line which is connected to the anode side of the fuel cell and supplies gas containing hydrogen gas to the fuel cell; a hydrogen supply valve which is located between the hydrogen supply line and a hydrogen tank, supplies, when opened, hydrogen gas stored in the hydrogen tank to the hydrogen supply line, and blocks the supply of the hydrogen gas when closed; and a deterioration estimating unit which estimates a deterioration state of the fuel cell, based on the opening and closing control of the hydrogen supply valve or a change in the pressure in the hydrogen supply line.

The deterioration estimation system may further include: a pressure sensor which is provided in the hydrogen supply line and senses pressure inside the hydrogen supply line. The hydrogen supply valve may be controlled to be opened or closed, based on the pressure in the hydrogen supply line sensed by the pressure sensor.

The deterioration estimating unit may measure the frequency at which the hydrogen supply valve is opened, the period during which the hydrogen supply valve is opened, or the number of times the hydrogen supply valve is opened in a predetermined time, and may estimate the deterioration state of a membrane or an electrode included inside the fuel cell, based on the measured frequency, period, or number of open times in a predetermined time.

The deterioration estimation system may further include: a pressure sensor which is provided in the hydrogen supply line and senses the pressure inside the hydrogen supply line. The deterioration estimating unit may estimate the deterioration state of a membrane or an electrode included inside the fuel cell, based on a change in the pressure in the hydrogen supply line sensed by the pressure sensor in the state in which the hydrogen supply valve is closed.

The deterioration estimating unit may estimate the deterioration state of the fuel cell in an FC STOP mode in which power generation by the fuel cell is stopped, based on opening and closing control of the hydrogen supply valve or a change in the pressure in the hydrogen supply line.

The deterioration estimating unit may estimate a deterioration state of the fuel cell in the state in which a target pressure in the hydrogen supply line is constant based on opening and closing control of the hydrogen supply valve or a change in the pressure in the hydrogen supply line.

In order to achieve the above object, a hydrogen supply system for the fuel cell according to the present disclosure, which includes the deterioration estimation system for the fuel cell, may further include: a concentration estimating unit which takes the estimated deterioration state of the fuel cell into account to estimate a hydrogen concentration in the hydrogen supply line.

The concentration estimating unit may estimate an amount crossing over between the anode side of the fuel cell and the cathode side thereof and a purge amount purged to the outside, may estimate a hydrogen concentration in the hydrogen supply line by applying the estimated crossover amount and purge amount to an initial concentration in the hydrogen supply line, and may estimate a crossover amount, based on the increase of the amount crossing over between the anode side of the fuel cell and the cathode side thereof as the estimated deterioration state of the fuel cell worsens.

The hydrogen supply system may further include: a purge valve which is provided in the hydrogen supply line at the outlet side of the fuel cell and discharges gas inside the hydrogen supply line to the outside when opened; and a purge control unit which controls opening and closing of the purge valve, based on a hydrogen concentration in the hydrogen supply line estimated by the concentration estimating unit.

The purge control unit may vary a frequency, a period, or a number of times in a predetermined time for which the purge valve is controlled to be opened, based on the estimated deterioration state of the fuel cell.

In order to achieve the above object, a hydrogen supply method for a fuel cell according to the present disclosure includes: controlling opening and closing of the hydrogen supply valve so that internal pressure in the hydrogen supply line that supplies gas containing hydrogen gas to an anode side of the fuel cell is varied; estimating a deterioration state of the fuel cell, based on a change in the pressure in the hydrogen supply line or on opening and closing control of the hydrogen supply valve; and estimating a hydrogen concentration in the hydrogen supply line by taking the estimated deterioration state of the fuel cell into account.

In the controlling the opening and closing of the hydrogen supply valve, the hydrogen supply valve may be controlled to be opened or closed, based on the pressure in the hydrogen supply line sensed by the pressure sensor that is provided in the hydrogen supply line and senses pressure inside the hydrogen supply line.

The hydrogen supply method may further include: maintaining a constant target pressure in the hydrogen supply line prior to controlling the opening and closing of the hydrogen supply valve.

In the estimating the deterioration state of the fuel cell, the frequency at which the hydrogen supply valve is opened, the period during which the hydrogen supply valve is opened, or the number of times the hydrogen supply valve is opened in a predetermined time may be measured, and the deterioration state of a membrane or an electrode included inside the fuel cell may be estimated based on the measured frequency, period, or number of open times in the predetermined time.

In the estimating the deterioration state of the fuel cell, a deterioration state of the membrane or the electrode included inside the fuel cell may be estimated based on a change in the pressure in the hydrogen supply line sensed by the pressure sensor in the state in which the hydrogen supply valve is closed.

The estimating the hydrogen concentration in the hydrogen supply line may include: estimating an amount crossing over between the anode side of the fuel cell and the cathode side thereof and a purge amount purged to the outside; and estimating a hydrogen concentration in the hydrogen supply line by applying the estimated crossover amount and purge amount to an initial concentration in the hydrogen supply line. In the estimating the crossover amount and the purge amount purged to the outside, a crossover amount may be estimated based on the increase of the amount crossing over between the anode side of the fuel cell and the cathode side thereof as the estimated deterioration state of the fuel cell worsens.

The hydrogen supply method may further include: after the estimating the hydrogen concentration in the hydrogen supply line, controlling opening and closing of the purge valve, based on the estimated hydrogen concentration in the hydrogen supply line.

In the controlling the opening and closing of the purge valve, a frequency, a period, or a number of open times in a predetermined time for which the purge valve is controlled to be opened may be varied based on the estimated deterioration state of the fuel cell.

According to a deterioration estimation system for a fuel cell, a hydrogen supply system for a fuel cell including the same, and a hydrogen supply method for a fuel cell of the present disclosure, the deterioration state of a fuel cell can be estimated without the need for an additional device.

In addition, the accuracy of estimation of a hydrogen concentration in a hydrogen supply line can be improved using the estimated deterioration state of the fuel cell, and accordingly, a hydrogen concentration can be controlled.

Therefore, the hydrogen concentration in the hydrogen supply line can be appropriately maintained in consideration of both durability improvement and fuel efficiency improvement of the fuel cell.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
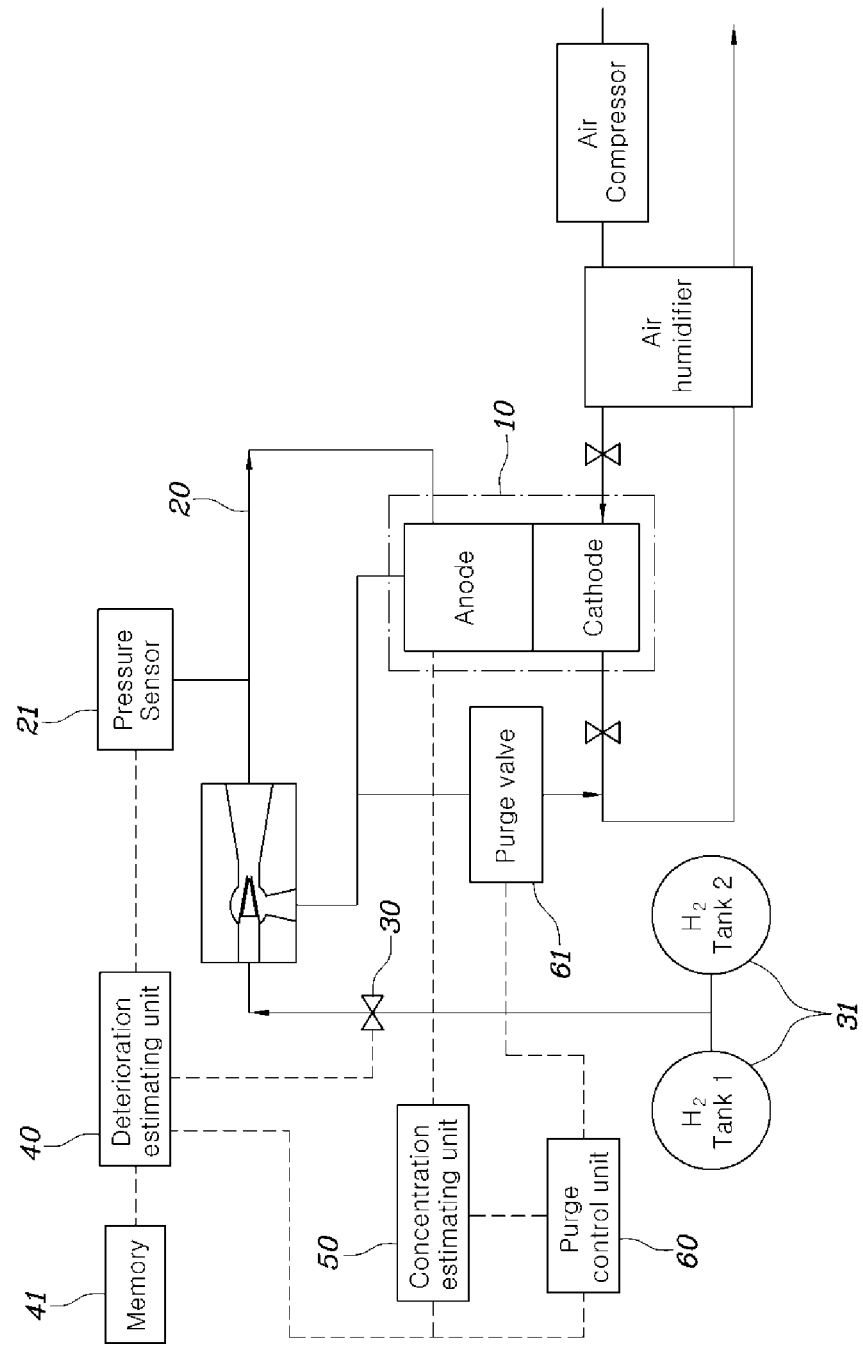
FIG. 1 is a configuration diagram of a hydrogen supply system for a fuel cell including a deterioration estimation system for the fuel cell according to one embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Although ordinal numbers such as "first", "second" and the like may be used to describe various elements, the elements should not be defined by the terms. The terms are merely used to distinguish an element from another element, and thus a first element may be named a second element while the second element may be similarly named the first element without departing from the scope of protection according to the concept of the present disclosure.

In the case where an element is referred to as being "connected" to or "accessed" by other elements, it should be understood to include not only the case where the element is directly connected or accessed to the other elements, but also the case where another element exists between them. In contrast, in the case where a component is referred to as being "directly connected" to or "directly accessed" by another component, it should be understood that there is no additional component therebetween. The other expressions describing relationships between structural elements, i.e. "between" and "just between" or "neighboring" and "directly neighboring", should be interpreted similarly to the above description.

In the present specification, the terms are merely used to describe specific embodiments, and are not intended to limit the present disclosure. As used herein, the singular forms are intended to include the plural forms as well, unless the context clearly indicates otherwise. In the description, it should be understood that the terms "include" or "have" indicate the existence of a feature, a number, a step, an operation, a structural element, parts, or a combination thereof, and but do not exclude the existence or probability of addition of one or more other features, numerals, steps, operations, structural elements, parts, or combinations thereof.

Unless defined differently, all terms used herein, including technical terminologies or scientific terminologies, have the same meanings as those generally understood by a person skilled in the art to which the present disclosure belongs. It should be interpreted that terms identical to those defined in general dictionaries have meanings identical to those in the context of the related technique. The terms should not be ideally or excessively interpreted according to formal meanings unless not clearly defined otherwise.

Hereinafter, a preferred embodiment of the present disclosure will be described in detail with reference to the accompanying drawings. Similar reference numerals presented in the drawings denote similar elements.

Figure 2:
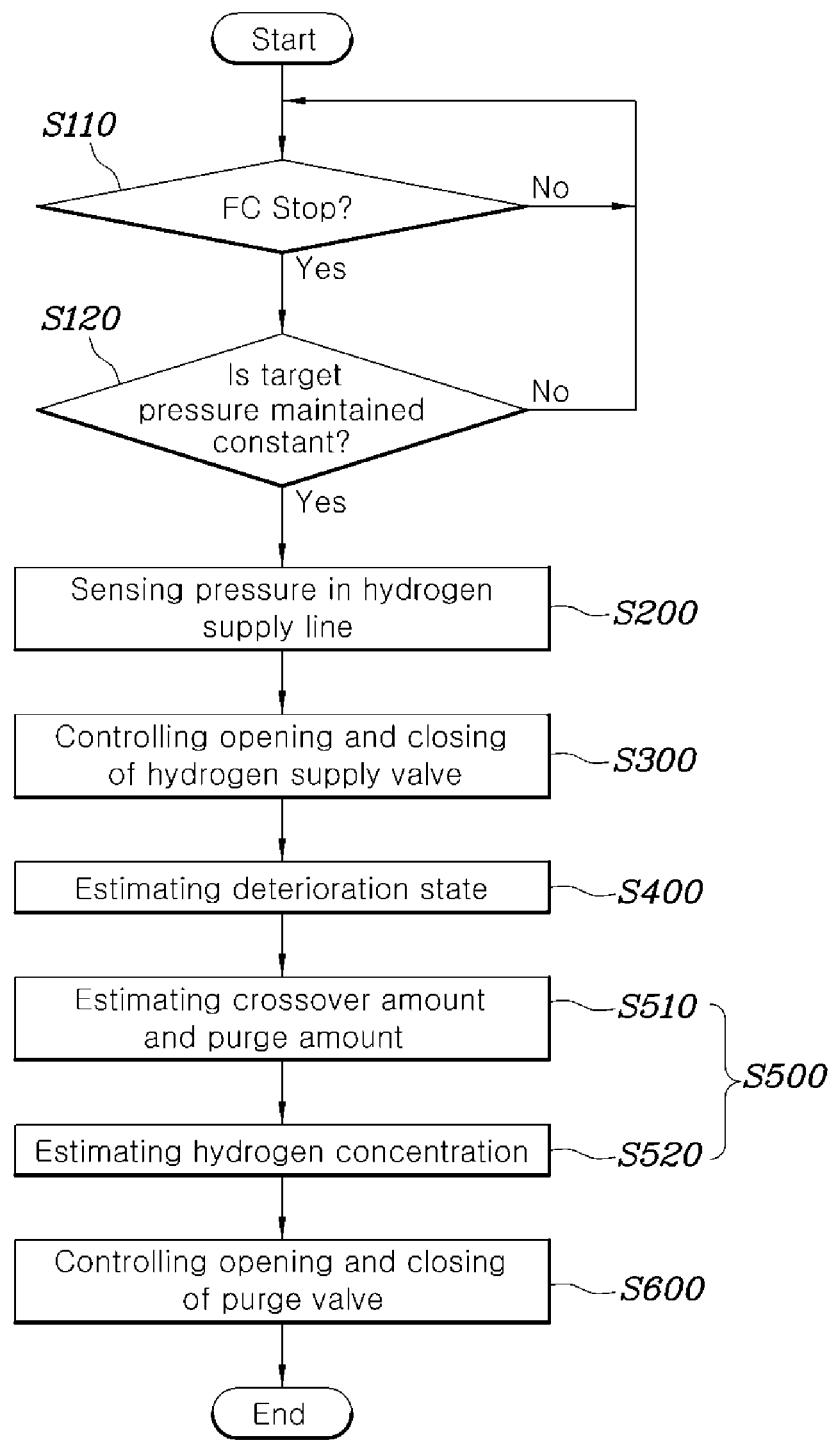
FIG. 2 is a flowchart of a hydrogen supply method for the fuel cell according to one embodiment of the present disclosure.

FIG. 1 is a configuration diagram of a hydrogen supply system for a fuel cell 10 including a deterioration estimation system for the fuel cell 10 according to one embodiment of the present disclosure, and FIG. 2 is a flowchart of a hydrogen supply method for the fuel cell 10 according to one embodiment of the present disclosure.

Referring to FIGS. 1 and 2, the deterioration estimation system for the fuel cell 10 according to one embodiment of the present disclosure includes: the fuel cell 10 which receives hydrogen gas and oxidizing gas respectively supplied to an anode side and a cathode side thereof to generate electrical power; a hydrogen supply line 20 which is connected to the anode side of the fuel cell 10 and supplies gas containing hydrogen gas to the fuel cell 10; a hydrogen supply valve 30 which is located between the hydrogen supply line 20 and a hydrogen tank 31, supplies, when opened, hydrogen gas stored in the hydrogen tank 31 to the hydrogen supply line 20, and blocks the supply of the hydrogen gas when closed; and a deterioration estimating unit 40 which estimates the deterioration state of the fuel cell 10, based on the opening and closing control of the hydrogen supply valve 30 or a change in the pressure in the hydrogen supply line 20.

The fuel cell 10 may be a fuel cell stack 10 including a membrane electrode assembly (MEA) therein. Hydrogen and oxygen in the air may chemically react with each other inside the fuel cell 10 to generate electrical energy.

The hydrogen supply line 20 is connected to the anode side of the fuel cell 10 and supplies hydrogen to the fuel cell 10. Particularly, the hydrogen supply line 20 may be connected such that gas containing hydrogen discharged from an outlet of the fuel cell 10 is recirculated back to an inlet of the fuel cell 10.

That is, the hydrogen supply line 20 may be connected to the anode side of the fuel cell 10 and supply gas containing hydrogen gas to the fuel cell 10 while recirculating the gas.

The hydrogen tank 31 may be a high-pressure container which stores high-pressure hydrogen therein, and a plurality of hydrogen tanks 31 may be provided. The hydrogen tank 31 may be connected to the hydrogen supply line 20 and supply hydrogen stored therein to the hydrogen supply line 20.

The hydrogen supply valve 30 may be located between the hydrogen supply line 20 and the hydrogen tank 31 and adjust the amount of hydrogen supplied to the hydrogen supply line 20 from the hydrogen tank 31. Particularly, the hydrogen supply valve 30 may supply, when opened, hydrogen gas stored in the hydrogen tank 31 to the hydrogen supply line 20 and block the supply of the hydrogen gas when closed.

The hydrogen supply valve 30 may be connected to the hydrogen supply line 20 at the inlet side of the fuel cell 10, and may be connected to the hydrogen supply line 20 through an ejector, and thus may induce circulation in the hydrogen supply line 20 by using a differential pressure.

The deterioration estimating unit 40 may estimate a deterioration state of the fuel cell 10 through the opening and closing control of the hydrogen supply valve 30. Alternatively, the deterioration state of the fuel cell 10 may be estimated through a change in the pressure in the hydrogen supply line 20 while the pressure in the hydrogen supply line 20 is monitored.

Here, the deterioration state of the fuel cell 10 may mean irreversible deterioration caused by the generation of pinholes, a decrease in the thickness of a membrane, or the like, rather than reversible deterioration of the fuel cell 10. In particular, the deterioration state of the fuel cell 10 may refer to deterioration that influences the amount of gas crossing over by material exchange between a membrane and an electrode of the fuel cell 10.

The deterioration estimation system may further include: a pressure sensor which is provided in the hydrogen supply line 20 and senses the pressure inside the hydrogen supply line 20. The hydrogen supply valve 30 may be controlled to be opened or closed, based on the pressure in the hydrogen supply line 20 sensed by the pressure sensor.

The pressure sensor may sense the pressure inside the hydrogen supply line 20, and the hydrogen supply valve 30 may be controlled by a separate control unit, ECU, or the like to allow the pressure in the hydrogen supply line 20 sensed by the pressure sensor to follow a target pressure. In detail, a predetermined hysteresis of the hydrogen supply line 20 may be formed in the target pressure, and the hydrogen supply valve 30 may be controlled to be opened at the lower limit of the hysteresis and to be closed at the upper limit of the hysteresis.

The target pressure in the hydrogen supply line 20 may be varied by the load of an electric component (e.g., a driving motor) connected to the fuel cell 10, the charge amount of a high-voltage battery, the pressure in an air supply line, and the like.

Figure 3:
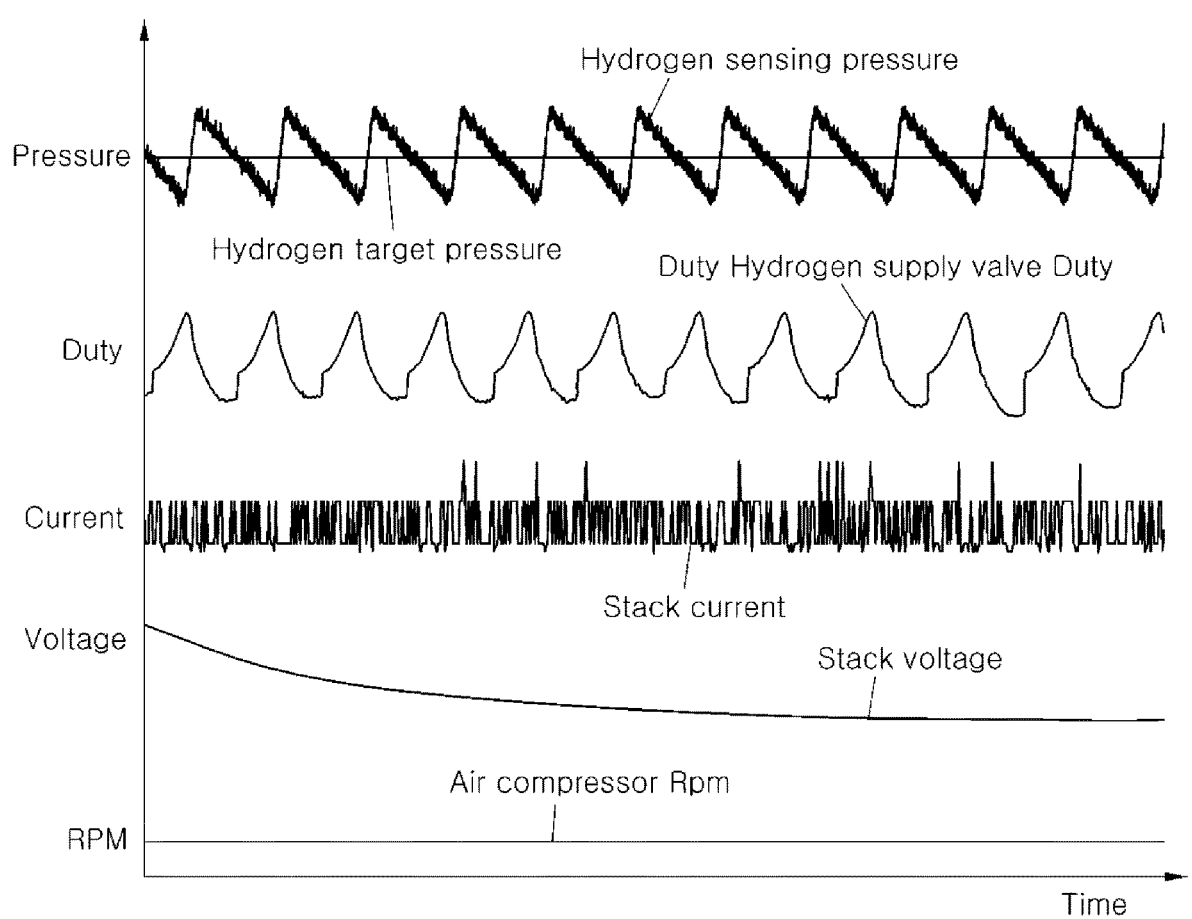
FIG. 3 illustrates a control signal over time in an FC Stop mode of the fuel cell according to one embodiment of the present disclosure.
Figure 4:
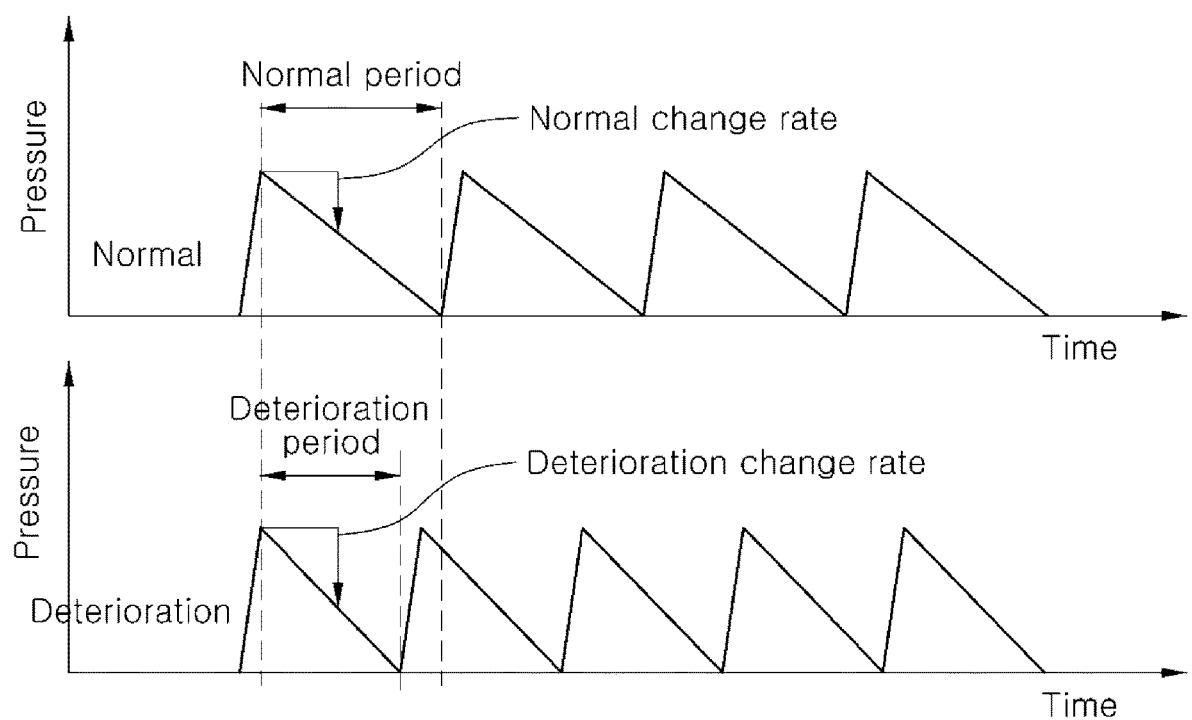
FIG. 4 illustrates a pressure sensed by a pressure sensor according to one embodiment of the present disclosure.

FIG. 3 illustrates a control signal of the fuel cell 10 over time in a FC Stop mode according to one embodiment of the present disclosure, and FIG. 4 illustrates pressure sensed by a pressure sensor according to one embodiment of the present disclosure.

Further referring to FIGS. 3 and 4, the deterioration estimating unit 40 may measure a frequency at which the hydrogen supply valve 30 is opened, a period during which the hydrogen supply valve 30 is opened, or a number of times the hydrogen supply valve 30 is opened in a predetermined time, and may estimate the deterioration state of a membrane or an electrode included inside the fuel cell 10, based on the measured frequency, period, or number of open times in a predetermined time.

In detail, the deterioration estimating unit 40 may measure a frequency at which the hydrogen supply valve 30 is opened, a period during which the hydrogen supply valve 30 is opened, or a number of times the hydrogen supply valve 30 is opened in a predetermined time, and may estimate the deterioration state of the fuel cell 10 by comparing measurement results with a normal frequency, a normal period, and a normal number of times, measured and stored in a state before deterioration of the fuel cell 10.

Referring to the duty ratio of the hydrogen supply valve 30 as shown in FIG. 3, the hydrogen supply valve 30 may be controlled to be opened when the sensing pressure sensed by the pressure sensor falls (Duty=1) and may be controlled to be closed when the sensing pressure increases (Duty=0). The deterioration estimating unit 40 may measure a frequency at which the hydrogen supply valve 30 is opened, a period during which the hydrogen supply valve 30 is opened, or a number of open times in a predetermined time through a control signal input to the hydrogen supply valve 30.

In addition, the deterioration estimating unit 40 may estimate the deterioration state of a membrane or an electrode included inside the fuel cell 10, based on a change in pressure in the hydrogen supply line 20 sensed by the pressure sensor in the state in which the hydrogen supply valve 30 is closed.

In detail, the deterioration estimating unit 40 may estimate the deterioration state of the fuel cell 10 by measuring a change rate in pressure in the hydrogen supply line 20 and comparing the measured change rate with a stored normal change rate obtained by measuring a change rate in pressure in the hydrogen supply line 20 in a normal state.

A normal frequency, a normal period, a normal number of times, a normal change rate, and the like may be stored in a memory 41. The memory 41 may be an inactive storage memory.

As shown in FIG. 4, a change in pressure in the hydrogen supply line 20 may occur more rapidly when a membrane or an electrode inside the fuel cell 10 is deteriorated compared to when the same is in a normal state. In detail, when the membrane or electrode between the anode side and the cathode side of the fuel cell 10 is deteriorated, a crossover amount of gas generated between the membranes or electrodes may increase, and thus the pressure in the hydrogen supply line 20 may decrease rapidly.

In particular, the deterioration estimating unit 40 may measure a change in the pressure in the hydrogen supply line 20 in the state in which the hydrogen supply valve 30 is closed, and thus may eliminate the influence changeable by the hydrogen supply valve 30.

The deterioration estimating unit 40 may estimate the deterioration state of the fuel cell 10 in an FC STOP mode in which power generation by the fuel cell 10 is stopped, based on the opening and closing control of the hydrogen supply valve 30 or a change in the pressure in the hydrogen supply line 20.

The deterioration estimating unit 40 may determine whether it is the FC STOP mode in which power generation by the fuel cell 10 is stopped, by determining whether an output current of the fuel cell 10 is 0 or equal to or less than a predetermined current. Further, deterioration estimating unit 40 may determine whether an output voltage of the fuel cell 10 is equal to or less than a predetermined voltage (e.g., 300[V]). Moreover, the deterioration estimating unit 40 may determine whether a number of rotations of an air compressor that supplies air to the cathode side of the fuel cell 10 is 0 or equal to or less than a predetermined number of rotations.

The deterioration estimating unit 40 may estimate the deterioration state of the fuel cell 10 in the FC STOP mode and thus may estimate the deterioration state of the fuel cell 10 in the state in which the influence of hydrogen consumption by the power generation of the fuel cell 10 is eliminated.

In addition, the deterioration estimating unit 40 may estimate a deterioration state of the fuel cell 10 in the state in which a target pressure in the hydrogen supply line 20 is constant based on opening and closing control of the hydrogen supply valve 30 or a change in the pressure in the hydrogen supply line 20.

The target pressure in the hydrogen supply line 20 may be varied according to a power generation state of the fuel cell 10. However, the target pressure in the hydrogen supply line 20 may be maintained constant in the FC STOP mode of the fuel cell 10.

The deterioration estimating unit 40 may estimate a deterioration state of the fuel cell 10 in the state in which the target pressure in the hydrogen supply line 20 is constant and thus may eliminate an influence in which the hydrogen supply valve 30 is opened and closed or the pressure in the hydrogen supply line 20 is varied according to a change in the target pressure.

In this regard, the deterioration estimating unit 40 may estimate a deterioration state of the fuel cell 10 in the state in which purge control is not carried out based on the opening and closing control of the hydrogen supply valve 30 or a change in the pressure in the hydrogen supply line 20. As a result, the effect of the purging on a change in the pressure in the hydrogen supply line 20 may be eliminated.

In another embodiment, the deterioration estimating unit 40 may also estimate a deterioration state of the fuel cell 10 in the state in which the purge control is carried out, based on the opening and closing control of the hydrogen supply valve 30 or a change in the pressure in the hydrogen supply line 20. Since the purge control is performed based on a concentration in the hydrogen supply line 20, when a hydrogen concentration in the hydrogen supply line 20 changes rapidly as a crossover amount in the hydrogen supply line 20 increases, the purge control may be carried out more frequently. As a result, a great change may occur in the pressure in the hydrogen supply line 20 when the crossover amount increases.

A hydrogen supply system for the fuel cell 10 according to one embodiment of the present disclosure, which includes the deterioration estimation system for the fuel cell 10, may further include: a concentration estimating unit 50 which takes the estimated deterioration state of the fuel cell 10 into account to estimate a hydrogen concentration in the hydrogen supply line 20.

In detail, the concentration estimating unit 50 may estimate an amount crossing over between the anode side of the fuel cell 10 and the cathode side thereof and a purge amount purged to the outside and may estimate a hydrogen concentration in the hydrogen supply line 20 by applying the estimated crossover amount and purge amount to an initial concentration in the hydrogen supply line 20.

The initial concentration may be configured by a concentration of gas stored at the start-off of the fuel cell 10 or may be estimated in consideration of the time during which the start-off of the fuel cell 10 lasted. For example, in a case of a vehicle using the fuel cell 10, the initial concentration may be estimated by the concentration varied according to a parking time.

The hydrogen supply line 20 may be assumed to include hydrogen, nitrogen, and steam. A hydrogen amount may be calculated by subtracting a nitrogen amount and a steam amount from a total gas amount, and a hydrogen concentration may be estimated using the calculated hydrogen amount.

The total gas amount ($n_{An}$) in the hydrogen supply line 20 may be estimated using gas pressure (P), volume (V), and temperature (T) in the hydrogen supply line 20 from an ideal gas state equation as shown in the following equation, $$n_{An} = \frac{P_{An} V_{An}}{RT} [mol],$$

wherein R is a gas constant, 8.314 [J/mol K].

The gas diffusion rate may be inversely proportional to the thickness of an electrolyte membrane of the fuel cell stack 10 and may be proportional to the difference in partial pressure of gas between the anode side and the cathode side. In detail, an amount of gas that crosses over may be calculated by applying the following FICK's LAW (diffusion law), $$\frac{\dot{m}}{A} = -D\frac{\partial c}{\partial x} = -D\frac{M}{RT}\frac{\partial c}{\partial x},$$

wherein $\dot{m}$ is a mass diffusion rate (g/s) of gas, A is a diffusion area, D is a gas diffusion coefficient, x is a diffusion distance, c is a gas concentration, R is an universal gas constant (8.314 J/mol·K), P is gas pressure, T is gas temperature, and M is molar mass of the gas (g/mol). This can be summarized, as follows:

$$\dot{m} = -D\frac{M}{RT}\frac{\partial P}{\partial x}A = \dot{n} \cdot M \text{ and } \dot{n} = -D\frac{1}{RT}\frac{\partial P}{\partial x}A,$$

wherein $\dot{n}$ is a gas diffusion rate (mol/s).

That is, the amount of gas crossing over between the electrolyte membranes of the fuel cell 10 may be calculated the following equation, $$n_{N2\_XO} = -\frac{D_{N2}}{RT}\frac{P_{Ca,N2} - P_{An,N2}}{\delta}A,$$

wherein $n_{N2\_XO}$ is a diffusion rate of nitrogen, P is pressure [kPa], R is a gas constant, 8.314 [J/mol/K], T is temperature [K], D is a diffusion coefficient, A is an area of the electrolyte membrane, δ is the thickness of the electrolyte membrane, $P_{Ca,N2}$ is the partial pressure of nitrogen on the cathode side of the fuel cell 10, and $P_{An,N2}$ is the partial pressure of nitrogen on the anode side of the fuel cell 10.

$$n_{V\_XO} = -\frac{D_V}{RT}\frac{P_{Ca,V} - P_{An,V}}{\delta}A,$$

wherein $n_{V\_XO}$ is a diffusion rate of steam, P is pressure [kPa], R is a gas constant, 8.314 [J/mol/K], T is temperature [K], D is a diffusion coefficient, A is an area of the electrolyte membrane, S is the thickness of the electrolyte membrane, $P_{Ca,V}$ is the partial pressure of steam on the cathode side of the fuel cell 10, and $P_{An,V}$ is the partial pressure of steam on the anode side of the fuel cell 10.

In contrast with nitrogen and steam, hydrogen may cross over from the anode side to the cathode side of the fuel cell 10.

$$n_{H2\_XO} = \frac{D_{H2}}{RT}\frac{P_{Ca,H2} - P_{An,H2}}{\delta}A,$$

wherein $n_{H2\_XO}$ is a diffusion rate of hydrogen, P is pressure [kPa], R is a gas constant, 8.314 [J/mol/K], T is temperature [K], D is a diffusion coefficient, A is an area of the electrolyte membrane, S is the thickness of the electrolyte membrane, $P_{An,H2}$ is the partial pressure of hydrogen on the anode side, and $P_{Ca,H2}$ is the partial pressure of hydrogen on the cathode side.

In addition, the gas diffusion rate is proportional to the gas diffusion coefficient, and the gas diffusion coefficient may vary depending on the water content and temperature of the electrolyte membrane located between the anode side and the cathode side of the fuel cell 10.

The gas diffusion coefficient (D) may use a value that varies depending on a deterioration state, temperature, or the like of the fuel cell 10. More specifically, the gas diffusion coefficient (D) may be calculated using a value that varies depending on water content and temperature of the electrolyte membrane located between the anode side and the cathode side of the fuel cell 10.

The gas purge rate, $n_{purge}$ may be proportional to the difference in pressure between the gas pressure ($P_{An}$) at the anode side and external gas pressure ($P_{Out}$). The external gas pressure ($P_{Out}$) may be the gas pressure at the cathode side. The specific equation may be, as follows: $n_{purge} = C (P_{An} - P_{Out})$, wherein C, which is a purge gain value, may be a value determined by a purge period, an opening degree of a purge valve 61 at the time of purging, an opening time of the purge valve 61, and the like.

Specifically, a purge rate for each gas may be calculated the following equation (a nitrogen purge rate $n_{N2\_purge}$ a steam purge rate $n_{V\_purge}$ and a hydrogen purge rate $n_{H2\_purge}$)).

$$n_{N2\_purge} = n_{purge} \cdot \frac{n_{N2}}{n_{An}}$$

$$n_{V\_purge} = n_{purge} \cdot \frac{n_V}{n_{An}}$$

$$n_{H2\_purge} = n_{purge} \cdot \frac{n_{H2}}{n_{An}}.$$

Each of an initial nitrogen amount and an initial steam amount in the hydrogen supply line 20 may be predicted, and each of the amounts of nitrogen and steam that cross over at the anode side and the amounts of purged nitrogen and steam may be calculated, so that a current nitrogen amount in the hydrogen supply line 20 may be calculated based on the amount of nitrogen that crosses over and the amount of nitrogen that is purged and a current steam amount in the hydrogen supply line 20 may be calculated based on the predicted initial steam amount, the amount of steam that crosses over, and the amount of steam that is purged.

That is, the current nitrogen amount and the current steam amount may be calculated by integrating the diffusion rate and the purge rate per unit time over time, based on the initial amount, using the above equation.

A current hydrogen amount may be calculated by subtracting the current nitrogen amount and the current steam amount from a total gas amount in the hydrogen supply line 20.

Therefore, a hydrogen concentration in the hydrogen supply line 20 may be estimated by calculating all of the gas amount, current nitrogen amount, current steam amount, and current hydrogen amount in the hydrogen supply line 20, under the assumption that the hydrogen supply line 20 has a uniform gas concentration.

Accordingly, the hydrogen concentration, which is difficult to estimate based on a reaction with oxygen, may be calculated through a nitrogen amount and a steam amount, thereby continuously monitoring the hydrogen concentration.

Additionally, during power generation by the fuel cell 10, the amount of hydrogen consumed due to the power generation by the fuel cell 10 may be estimated using the output current of the fuel cell 10. That is, the amount of hydrogen consumed due to the power generation by the fuel cell 10 may be estimated by integrating the output current to estimate the amount of hydrogen in the hydrogen supply line 20.

Referring again to FIG. 1, the concentration estimating unit 50 may estimate a crossover amount, based on the increase of the amount crossing over between the anode side of the fuel cell 10 and the cathode side thereof as the estimated deterioration state of the fuel cell 10 worsens.

In detail, the diffusion coefficient which is used to estimate a crossover amount may be corrected based on the deterioration state of the fuel cell 10. The diffusion coefficient may be configured to increase as the deterioration state of the fuel cell 10 worsens.

In another embodiment, the thickness of an electrolyte membrane, which is used to estimate a crossover amount, may vary based on the deterioration state of the fuel cell 10. The thickness of the electrolyte membrane may be configured to decrease as the deterioration state of the fuel cell 10 worsens.

In another embodiment, by multiplying the estimated crossover amount by a scaling factor configured based on the deterioration state of the fuel cell 10, it may be estimated that the crossover amount has increased.

The hydrogen supply system may further include: a purge valve 61 which is provided in the hydrogen supply line 20 at the outlet side of the fuel cell 10 and discharges gas inside the hydrogen supply line 20 to the outside when opened; and a purge control unit 60 which controls opening and closing of the purge valve 61, based on a hydrogen concentration in the hydrogen supply line 20, estimated by the concentration estimating unit 50.

The purge valve 61 may be controlled to be opened or closed by the purge control unit 60 and may discharge gas inside the hydrogen supply line 20 to the outside when the purge valve 61 is opened. In this regard, "the outside" may be a discharge opening side of an air supply line.

The purge control unit 60 may configure hysteresis for the hydrogen concentration in the hydrogen supply line 20, estimated by the concentration estimating unit 50, and may perform control such that the purge valve 61 is opened at the lower limit and closed at the upper limit, respectively.

The purge control unit 60 may vary a frequency, a period, or a number of times in a predetermined time for which the purge valve is controlled to be opened, based on the estimated deterioration state of the fuel cell 10.

In detail, the purge control unit 60 may vary the opening control of the purge valve, based on the estimated deterioration state of the fuel cell 10. As the deterioration state of the fuel cell 10 worsens, an opening frequency may be increased, an opening period may be decreased, or a number of times the purge valve 61 is opened in a predetermined time may be increased.

In one embodiment, the purge control unit 60 may increase the lower limit by varying the hysteresis configured for the hydrogen concentration in the hydrogen supply line 20 estimated by the concentration estimating unit 50. In another embodiment, the purge control unit 60 may carry out the purge control prior to the time point of the purge control according to a hydrogen concentration in the hydrogen supply line 20.

The deterioration estimating unit 40, the concentration estimating unit 50, and the purge control unit 60 according to an exemplary embodiment of the present disclosure may be implemented through an algorithm configured to control operations of various components of a vehicle or a nonvolatile memory (not shown) configured to store data related to instructions of software for reproducing the algorithm, and a processor (not shown) configured to perform operations described below, using data stored in the corresponding memory. In this regard, the memory and the processor may be implemented as a separate chip. Alternatively, the memory and the processor may be integrated with each other in the form of a single chip. One or more processors may be provided.

Referring back to FIG. 2, a hydrogen supply method for the fuel cell 10 according to one embodiment of the present disclosure includes: controlling opening and closing of the hydrogen supply valve 30 so that internal pressure in the hydrogen supply line 20 that supplies gas containing hydrogen gas to an anode side of the fuel cell 10 is varied (S300); estimating a deterioration state of the fuel cell 10, based on the change in the pressure in the hydrogen supply line 20 or the opening and closing control of the hydrogen supply valve 30 (S400); and estimating a hydrogen concentration in the hydrogen supply line 20 by taking the estimated deterioration state of the fuel cell 10 into account (S500).

In the controlling the opening and closing of the hydrogen supply valve 30 (S300), the hydrogen supply valve 30 may be controlled to be opened or closed, based on the pressure in the hydrogen supply line 20 sensed by the pressure sensor that is provided in the hydrogen supply line and senses the pressure inside the hydrogen supply line 20 (S200).

The hydrogen supply method may further include: maintaining a constant target pressure in the hydrogen supply line 20 (S120) prior to the controlling the opening and closing of the hydrogen supply valve 30 (S300).

Additionally, whether or not the fuel cell 10 is in the FC STOP mode is determined (S110) prior to maintaining a constant target pressure in the hydrogen supply line 20 (S120), and the target pressure in the hydrogen supply line 20 may be controlled to be maintained constant in the FC STOP mode.

In the estimating the deterioration state of the fuel cell 10 (S400), the frequency at which the hydrogen supply valve 30 is opened, the period during which the hydrogen supply valve 30 is opened, or the number of times the hydrogen supply valve 30 is opened in a predetermined time may be measured, and a deterioration state of a membrane or an electrode included inside the fuel cell 10 may be estimated based on the measured frequency, period, or number of open times in the predetermined time.

In the estimating the deterioration state of the fuel cell 10 (S400), a deterioration state of the membrane or the electrode included inside the fuel cell 10 may be estimated based on the change in pressure in the hydrogen supply line 20 sensed by the pressure sensor in the state in which the hydrogen supply valve 30 is closed.

The estimating the hydrogen concentration in the hydrogen supply line 20 (S500) may include: estimating an amount crossing over between the anode side of the fuel cell 10 and the cathode side thereof and a purge amount purged to the outside (S510); and estimating a hydrogen concentration in the hydrogen supply line 20 by applying the estimated crossover amount and purge amount to an initial concentration in the hydrogen supply line 20 (S520). In the estimating the crossover amount and the purge amount purged to the outside (S520), the crossover amount may be estimated based on the increase of the amount crossing over between the anode side of the fuel cell 10 and the cathode side thereof as the estimated deterioration state of the fuel cell 10 worsens.

The hydrogen supply method may further include: after the estimating the hydrogen concentration in the hydrogen supply line 20 (S520), controlling opening and closing of the purge valve 61, based on the estimated hydrogen concentration in the hydrogen supply line 20 (S600).

In the controlling the opening and closing of the purge valve 61 (S600), a frequency, a period, or a number of open times in a predetermined time for which the purge valve is controlled to be opened, may be varied based on the estimated deterioration state of the fuel cell 10.

Although the present disclosure has been described and illustrated with reference to the particular embodiments thereof, it will be apparent to those skilled in the art that various improvements and modifications of the present disclosure can be made without departing from the technical idea of the present disclosure provided by the following claims.

The invention claimed is:

1. A deterioration estimation system for a fuel cell, comprising:
    a fuel cell which receives hydrogen gas and oxidizing gas respectively supplied to an anode side and a cathode side thereof to generate electrical power;
    a hydrogen supply line which is connected to the anode side of the fuel cell and supplies gas containing hydrogen gas to the fuel cell;
    a hydrogen supply valve configured to open and close which is located between the hydrogen supply line and a hydrogen tank, and supplies, when opened, hydrogen gas stored in the hydrogen tank to the hydrogen supply line, and blocks supply of the hydrogen gas when closed;
    a deterioration estimator configured to estimate a deterioration state of the fuel cell, based on opening and closing control of the hydrogen supply valve and a change in the pressure in the hydrogen supply line;
    a pressure sensor provided in the hydrogen supply line configured to sense a pressure in the hydrogen supply line;
    a concentration estimator configured to estimate a hydrogen concentration in the hydrogen supply line by taking the estimated deterioration state of the fuel cell into account a purge valve which is provided in the hydrogen supply line at the outlet side of the fuel cell and discharges gas inside the hydrogen supply line to the outside when opened; and
    a purge controller configured to control opening and closing of the purge valve, based on a hydrogen concentration in the hydrogen supply line estimated by the concentration estimator;
    wherein the purge controller is configured to vary a frequency, a period, or a number of times in a predetermined time for which the purge valve is opened, based on the estimated deterioration state of the fuel cell;
    wherein the hydrogen supply valve is opened or closed based on the pressure in the hydrogen supply line sensed by the pressure sensor.

2. The system of claim 1, wherein the deterioration estimator is configured to estimate a deterioration state of a membrane or an electrode included inside the fuel cell, based on a change in pressure in the hydrogen supply line sensed by the pressure sensor in a state in which the hydrogen supply valve is closed.

3. The system of claim 1, wherein the deterioration estimator is configured to estimate the deterioration state of the fuel cell in an FC STOP mode in which power generation by the fuel cell is stopped, based on the opening and closing control of the hydrogen supply valve and the change in pressure in the hydrogen supply line.

4. The system of claim 1, wherein the deterioration estimator is configured to estimate the deterioration state of the fuel cell in a state in which a constant target pressure is maintained in the hydrogen supply line, based on the opening and closing control of the hydrogen supply valve and the change in pressure in the hydrogen supply line.

5. The system of claim 1,
    wherein the concentration estimator is configured to estimate an amount crossing over between the anode side of the fuel cell and the cathode side of the fuel cell and a purge amount purged to an outside, configured to estimate a hydrogen concentration in the hydrogen supply line by applying the estimated crossover amount and purge amount to an initial concentration in the hydrogen supply line, and configured to estimate a crossover amount, based on an increase in the amount crossing over between the anode side of the fuel cell and the cathode side thereof as the estimated deterioration state of the fuel cell worsens.

6. The system of claim 1, wherein the deterioration estimator is further configured to measure a frequency at which the hydrogen supply valve is opened, a period during which the hydrogen supply valve is opened, or a number of times the hydrogen supply valve is opened in a predetermined time, and is configured to estimate a deterioration state of a membrane or an electrode included inside the fuel cell based on the measured frequency, period, or number of open times of the hydrogen supply valve in a predetermined time.

* * * * *